(12) United States Patent
Lin et al.

(10) Patent No.: US 10,514,153 B2
(45) Date of Patent: Dec. 24, 2019

(54) BACKLIGHT MODULE AND DISPLAY DEVICE

(71) Applicant: AU OPTRONICS CORPORATION, Hsin-Chu (TW)

(72) Inventors: Yu-Hui Lin, Hsin-Chu (TW); Shau-Yu Tsai, Hsin-Chu (TW); Chih-Ling Hsueh, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/165,429

(22) Filed: Oct. 19, 2018

(65) Prior Publication Data

US 2019/0120463 A1 Apr. 25, 2019

(30) Foreign Application Priority Data

Oct. 24, 2017 (TW) .............................. 106136575 A (51) Int. Cl.
*F21V 11/16* (2006.01)
*F21V 7/00* (2006.01)
*F21V 7/06* (2006.01)
*F21Y 105/00* (2016.01)
(Continued)

(52) U.S. Cl.
CPC .............. *F21V 11/16* (2013.01); *F21V 7/005* (2013.01); *F21V 7/06* (2013.01); *F21Y 2103/10* (2016.08); *F21Y 2105/00* (2013.01); *F21Y 2115/10* (2016.08)

(58) Field of Classification Search
CPC ............. F21V 11/16; F21V 7/005; F21V 7/06
See application file for complete search history.

(56) References Cited

U.S. PATENT DOCUMENTS

| 7,635,206 B2 * | 12/2009 | Huang .................. F21S 41/147 362/296.01 |
| 2011/0090700 A1 * | 4/2011 | Lee .......................... F21V 7/06 362/296.08 |

(Continued)

FOREIGN PATENT DOCUMENTS

| CN | 1645218 A | 7/2005 |
| CN | 101865376 A | 10/2010 |
| CN | 102661537 A | 9/2012 |

(Continued)

OTHER PUBLICATIONS

An office action from the CNIPA dated Apr. 1, 2019.

*Primary Examiner* — Thomas M Sember
(74) *Attorney, Agent, or Firm* — WPAT, PC (57) ABSTRACT

A backlight module including a light source, a reflector, a chamber, and a block plate is provided. The light source has at least one light unit arranged along a first direction. The reflector extends along the first direction and a curve opposite the light unit is formed on a cross section perpendicular to the first direction. The reflector has a first end and a second end opposite to each other. The first end extends toward the light source while the second end forms a light exit with the light source. The chamber has a light entrance end facing the light exit to receive light reflected by the reflector. The block plate is disposed between the light unit and a light-receiving surface of the chamber to reduce the light directly reflected to the light-receiving surface of the chamber by the reflector.

17 Claims, 6 Drawing Sheets

(51) Int. Cl.
  *F21Y 115/10* (2016.01)
  *F21Y 103/10* (2016.01)

(56) References Cited

U.S. PATENT DOCUMENTS

2015/0029695 A1  1/2015  Fang
2016/0139320 A1  5/2016  Shin et al.

FOREIGN PATENT DOCUMENTS

TW   200907248   2/2009
TW   201116898   5/2011

\* cited by examiner

BACKLIGHT MODULE AND DISPLAY DEVICE

FIELD OF THE INVENTION

The present invention relates to a backlight module having a reflector and a display device using the same, and specifically to a backlight module having a reflector with a step structure and a display device using the same.

BACKGROUND OF THE INVENTION

Flat and curved display devices are widely applied to various electronic devices, such as mobile phones, personal wearable devices, televisions, in-vehicle devices, personal computers, digital cameras, handheld game consoles, and the like. However, with the improvement of specifications such as resolution and narrow bezel, the optical design in the display device also faces challenges.

Take liquid crystal display devices for example. Optical performance of a liquid crystal display is usually closely related to a backlight module disposed behind the display panel. A conventional backlight module can be roughly divided into two types: edge type backlight module and direct type backlight module. One type of the edge type backlight module reflects light from the lateral side of the display area using a concave reflecting element to introduce light into the display area, and then the light is reflected by a reflective sheet under beneath the display area, which generates backlight. However, this type of backlight module may produce a bright band on a side of the display area close to the light unit, thereby causing problems in use.

SUMMARY OF THE INVENTION

An objective of the present invention is to provide a backlight module and a display device including the same to improve the local light band problem on a side of a light unit.

The display device includes a display panel and a backlight module. The display panel is stacked on the backlight module to receive light therefrom. The backlight module includes a light source, a reflector, a chamber, and a block plate. The light source has at least one light unit arranged along a first direction. The reflector extends along the first direction and a curve opposite the light unit is formed on a cross section perpendicular to the first direction. The reflector has a first end and a second end opposite each other. The first end extends toward the light source while the second end forms a light exit with the light source. The chamber has a light entrance end facing the light exit to receive light reflected by the reflector, and reflects the light to a light-receiving surface.

The block plate is disposed between the light unit and the light-receiving surface. By the technical solution mentioned above, a proportion of light emitted from the light exit to the end of the light source is reduced, thereby reducing the proportion of the light directly reflected to the light-receiving surface of the chamber by the reflector so as to reduce light gathered on the side of the light-receiving surface close to the light entrance end.

DETAILED DESCRIPTION OF THE PREFERRED EMBODIMENTS

The present invention provides a display device and a backlight module thereof. The display device preferably includes a non-self-illuminated display panel such as a liquid crystal display panel or an electrophoretic display panel, and can be applied to computer displays, televisions, monitors and in-vehicle devices. In addition, the display device can also be used in other electronic devices such as display screens of mobile phones, digital cameras, handheld game consoles and the like.

Figure 1:
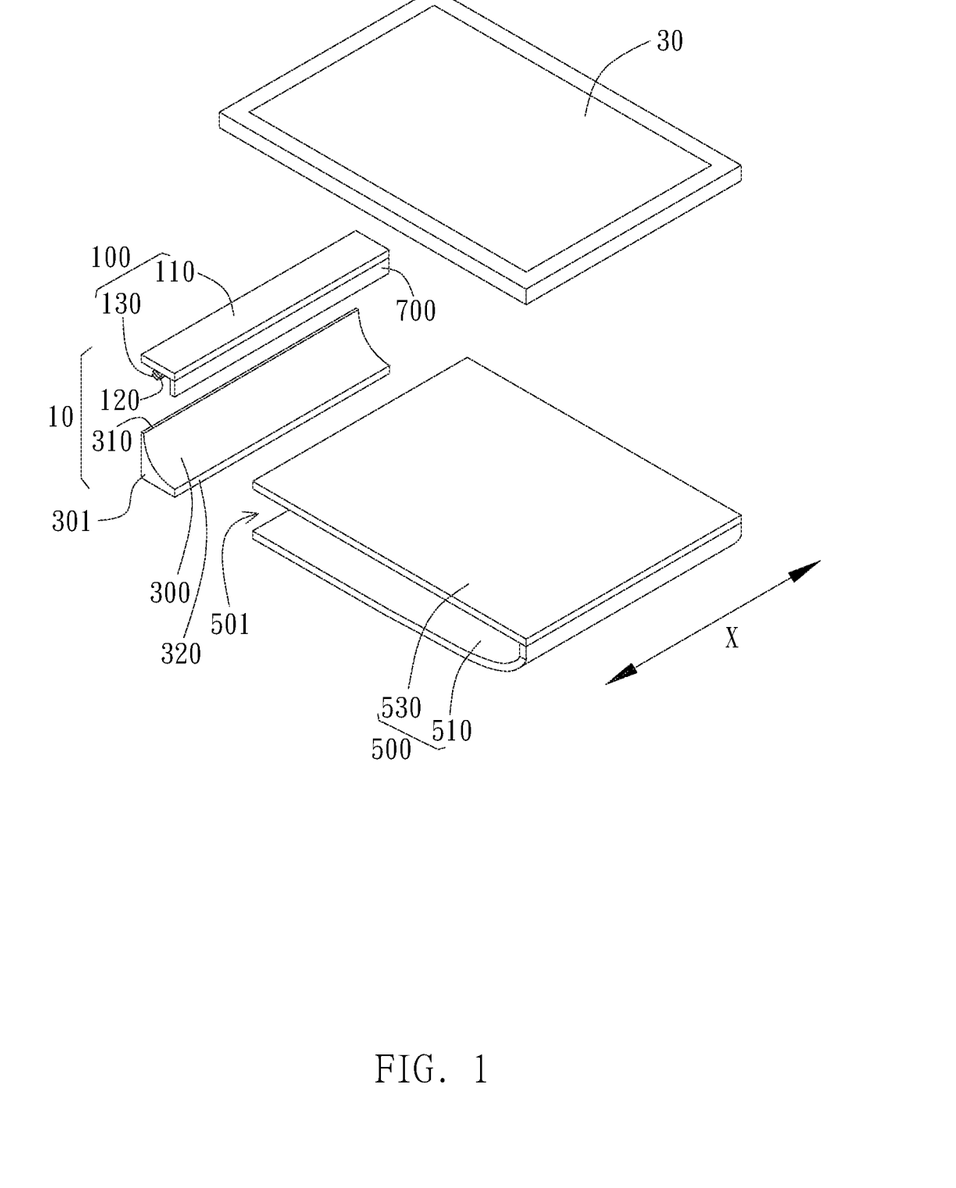
FIG. 1 is an exploded view of a display device according to an embodiment.
Figure 2:
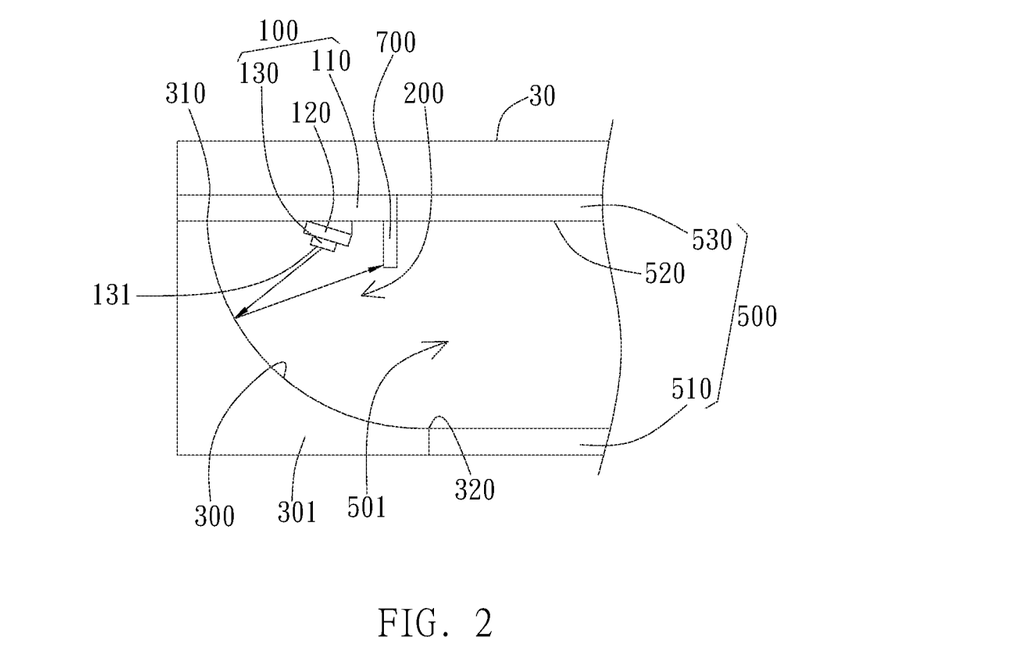
FIG. 2 is a schematic diagram illustrating a light path of a display device according to an embodiment.

In an embodiment shown in FIG. 1, a display device includes a display panel 30 and a backlight module 10. The display panel 30 is stacked on the backlight module 10 to receive light therefrom. The backlight module 10 includes a light source 100, a reflector 300, and a chamber 500. As shown in FIG. 1 and FIG. 2, the light source 100 includes a carrier substrate 110 and a plurality of light units 130. In this embodiment, the carrier substrate 110 is a metal or a plastic sheet with an elongated strip shape extended along a first direction X, for example, a metal heat dissipation substrate.

The light unit 130 is disposed on the carrier substrate 110 extending along the first direction X. In this embodiment, the light unit 130 is preferably a light-emitting diode, which is first arranged on a strip-shaped light unit substrate 120, and then disposed on the carrier substrate 110 by means of the light unit substrate 120. The light unit substrate 120 may preferably be a soft circuit board or printed circuit board. However, in other embodiments, the light unit 130 can also be directly arranged on the carrier substrate 110. In addition, in other embodiments, the light unit 130 can also be a single light unit, or a plurality of light units that extend along the first direction X, such as a cathode ray tube.

The reflector 300 extends along the first direction X, and is preferably disposed corresponding to the light unit 130. Specifically, as shown in FIG. 2, the reflector 300 preferably faces the light-emitting surface 131 of the light unit 130, that is, a surface from which the light unit 130 emits light. As shown in FIG. 2, which is a cross-sectional view, the reflector 300 is located below a surface of the carrier substrate 110 on which the light unit 130 is disposed, and has a first end 310 and a second end 320 parallel to the first direction X. The first end 310 extends toward the light source 100, and is preferably connected to the carrier substrate 110, but is not limited thereto. The second end 320 forms a light exit 200 with the light source 100. Light emitted by the light unit 130 can be emitted from the light exit 200 after being reflected by the reflector 300. In this embodiment, the reflector 300 is supported by a base 301.

The base 301 can be made of metal, plastic or other materials. The reflector 300 can be formed through surface treatment performed on the surface of the base 301 or formed by attaching another material onto the base 301. The base 301 can be connected to the carrier substrate 110, or integrally formed with the carrier substrate 110.

As shown in FIG. 1 and FIG. 2, preferably, the reflector 300 is linearly distributed in the first direction X without bending, but is not limited thereto. The reflector 300 forms a curve opposite the light unit 130 in a cross section (for example, the cross section shown in FIG. 2) perpendicular to the first direction X. Therefore, the reflector 300 is formed as an open curved groove extending along the first direction X.

The chamber 500 is preferably formed by the reflection portion 510 and the light-receiving surface 520. The reflection portion 510 is preferably connected to an end of the reflector 300 opposite the light source 100, while the light-receiving surface 520 is disposed opposite the reflector 300, and is preferably connected to the carrier substrate 110. The light-receiving surface 520 is located on a side of the light source 100 opposite the first end 310 of the reflector 300, and extends toward a direction away from the first end 310. The carrier substrate 110 of the light source 100 preferably extends between the first end 310 and the light-receiving surface 520. Preferably, an optical film 530 is disposed opposite the reflection portion 510, and the light-receiving surface 520 is formed on a surface of the optical film 530 facing the reflection portion 510. The optical film 530 may preferably be a diffusion sheet, a brightness enhancement film, or other light transmissive sheets. In addition, the optical film 530 may also be a substrate, a polarizer, or other light transmissive sheets disposed on the bottom surface of the display panel. The reflection portion 510 and an end of the light-receiving surface 520 facing a light exit 200 form a light entrance end 501. The light entrance end 501 faces the light exit 200 to receive light emitted from the light exit 200. After entering the chamber 500, the light is reflected by the reflection portion 510 and emitted out from the light-receiving surface 520.

As shown in FIG. 2, a block plate 700 is disposed between the light unit 130 and the light-receiving surface 520, and preferably extends along the first direction X. Preferably, the block plate 700 is installed on the carrier substrate 110. For example, the block plate 700 can be screw-connected to the carrier substrate 110 or integrally formed with the carrier substrate 110. However, in other embodiments, the block plate 700 may also be installed on the light-receiving surface 520. A part of the light generated by the light unit 130 that is reflected by the reflector 300 can advance toward the light-receiving surface 520, while the block plate 700 blocks at least a part of said light. By the technical solution, a proportion of light that is emitted from the light exit 200 to the light-receiving surface 520 is reduced, thereby reducing the proportion of the light not reflected by the reflection portion 510 but instead reaches the light-receiving surface 520 directly. In this way, light gathered on the side of the light-receiving surface 520 close to the light entrance end 501 can be reduced.

Figure 3:
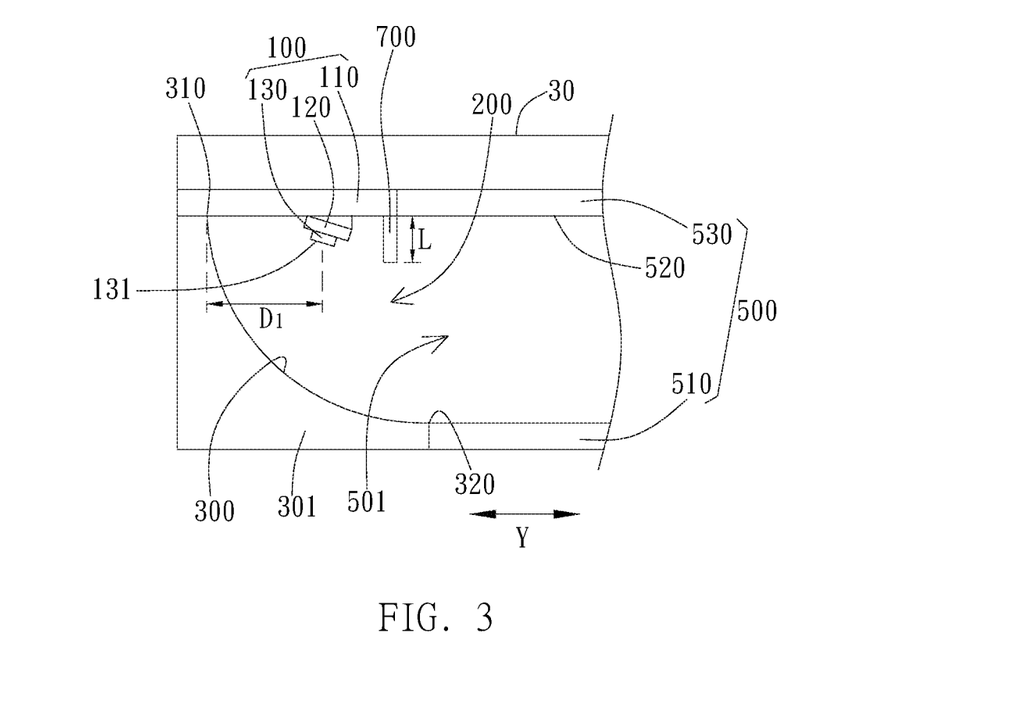
FIG. 3 is a cross-sectional view of a display device according to an embodiment.

As shown in FIG. 3, a first interval D1 (measured relative to a center of the light-emitting surface 131, for example) exists between the light unit 130 and the first end 310 in a second direction Y perpendicular to the first direction X and parallel to the light-receiving surface 520, and a length by which the block plate 700 extends away from the light-receiving surface 520 is L. The length L preferably refers to a length of the part of the block plate 700 that extends away from the light-receiving surface 520 in a direction perpendicular to the light-receiving surface 520. However, in other embodiments, the length L may also refer to an actual length by which the block plate 700 extends from the light-receiving surface 520 on the cross section shown in FIG. 3. Preferably, a ratio of the length L to the first interval D1 is between 0.8 and 1.625. In this manner, the present embodiment can greatly reduce the amount of light gathered at the light-receiving surface 520, and can also reflect light deep into the chamber 500 by using the reflector 300 to improve backlight uniformity. In addition, the length L is preferably not greater than 5 mm to maintain light use efficiency.

Figure 4:
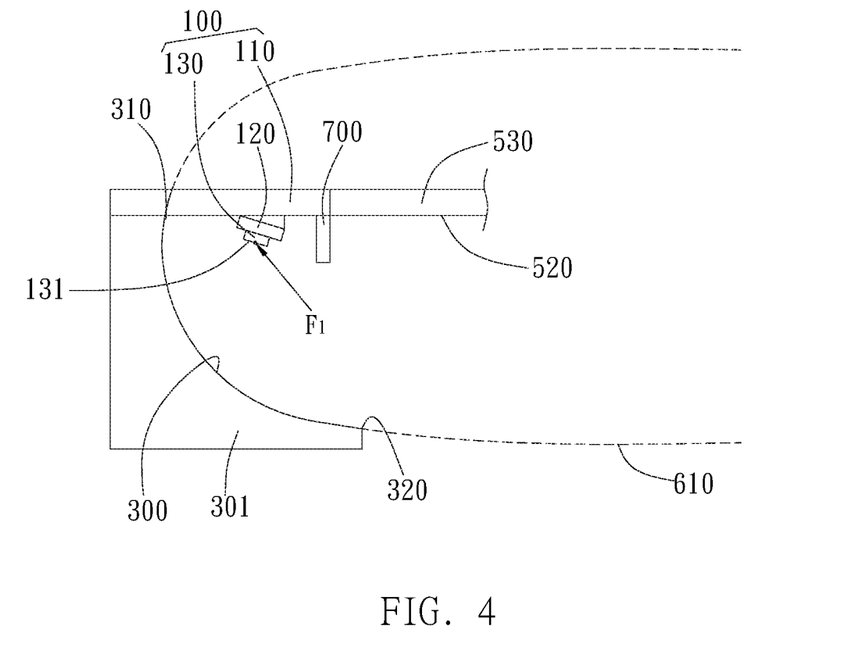
FIG. 4 is a cross-sectional view of a display device according to an embodiment.

On a cross section perpendicular to the first direction X, for example, the cross section shown in FIG. 4, a section line of the reflector 300 is essentially a part of a first parabola 610. However, in other embodiments, the section line of the reflector 300 can also be a part of other geometric curves, such as a hyperbola. The first parabola 610 has a first focus F1. In the preferred embodiment, the first focus F1 coincides with the light unit 130 and preferably coincides with the light-emitting surface 131 of the light unit 130. By the above-mentioned technical solution, the light generated by the light unit 130 can travel deep into the chamber 500 after being reflected by the reflector 300 to maintain light distribution uniformity.

In the foregoing embodiment, the block plate 700 is not disposed on the light-receiving surface 520, but is perpendicular to a plane where the light-receiving surface 520 is located. However, in the embodiment shown in FIG. 5, the block plate 700 can also tilt relative to the plane where the light-receiving surface 520 is located. Preferably, an angle θ exists between the block plate 700 and the plane where the light-receiving surface 520 is located on the side of the block plate 700 facing the light unit 130. The angle θ is preferably between 90 degrees and 110 degrees, which better matches the light path of reflected light.

Figure 5:
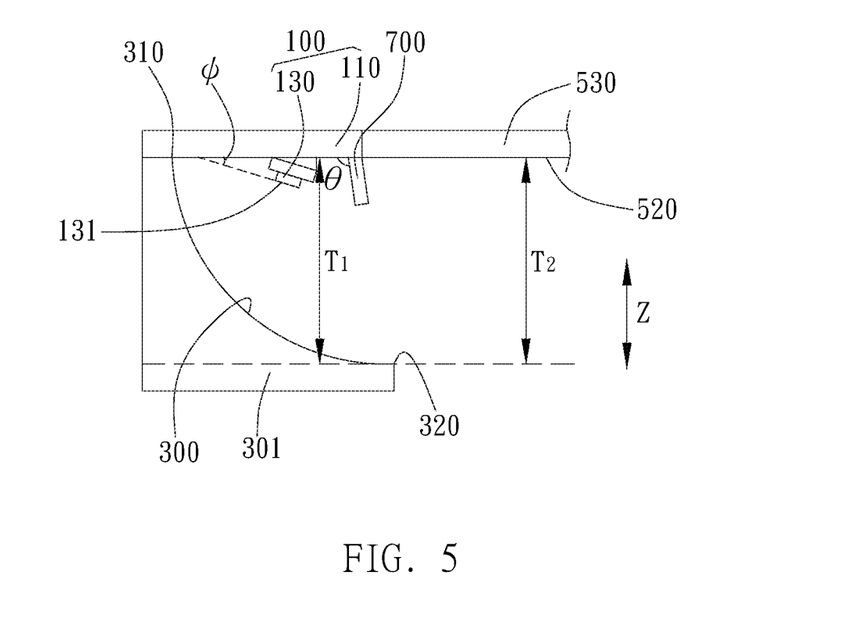
FIG. 5 is a cross-sectional view of a display device according to another embodiment.

In addition, as shown in FIG. 5, the light-emitting surface 131 of the light unit 130 preferably tilts toward the first end 310 relative to the plane where the light-receiving surface 520 is located. In other words, the light-emitting surface 131 faces the reflector 300 more than the light-receiving surface 520. An angle φ is formed between the light-emitting surface 131 and the plane where the light-receiving surface 520 is located. The angle φ is preferably less than 30 degrees to increase light use efficiency.

Figure 6:
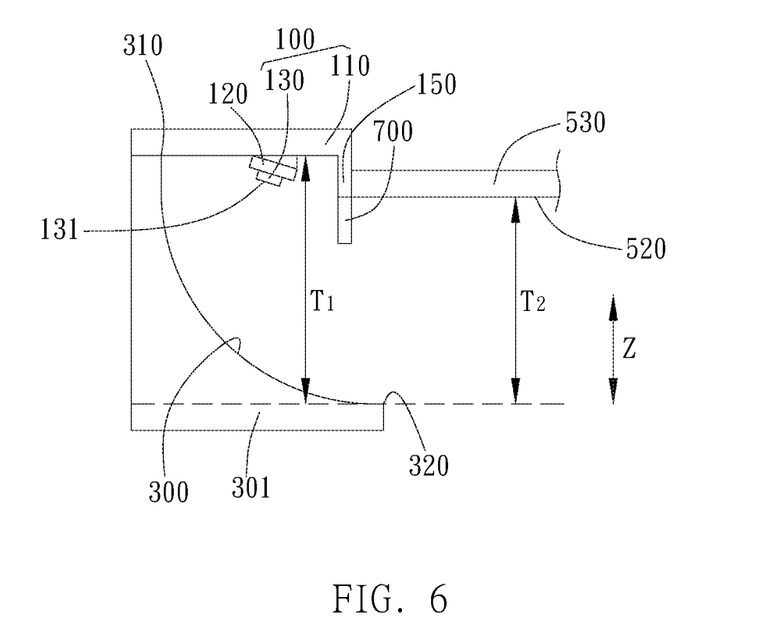
FIG. 6 is a cross-sectional view of a display device according to another embodiment.

In a preferred embodiment, on a third direction Z perpendicular to the light-receiving surface 520, a projection distance between the carrier substrate 110 and the second end 320 is T1, and a projection distance between the light-receiving surface 520 and the second end 320 is T2. Furthermore, T2≤T1. As shown in FIG. 5, the carrier substrate 110 and the light-receiving surface 520 are preferably in parallel and on the same plane, hence in this case T2=T1. However, in other embodiments, as shown in FIG. 6, the carrier substrate 110 may also be higher than the light-receiving surface relative to the second end 320, that is, T2<T1. Specifically, the light source 100 further includes a side wall 150 installed on the carrier substrate 110. The top and bottom ends of the side wall 150 are connected to an end of the carrier substrate 110 and an end of the light-receiving surface 520 respectively. Preferably, the block plate 700 extends from an end of the side wall 150 that is connected to the light-receiving surface 520, but is not limited thereto. By the aforementioned technical solution, it can be ensured that sufficient space for light reflection exists between the carrier substrate 100 and the reflector 300, and consistency of a traveling path of light is improved.

Figure 7:
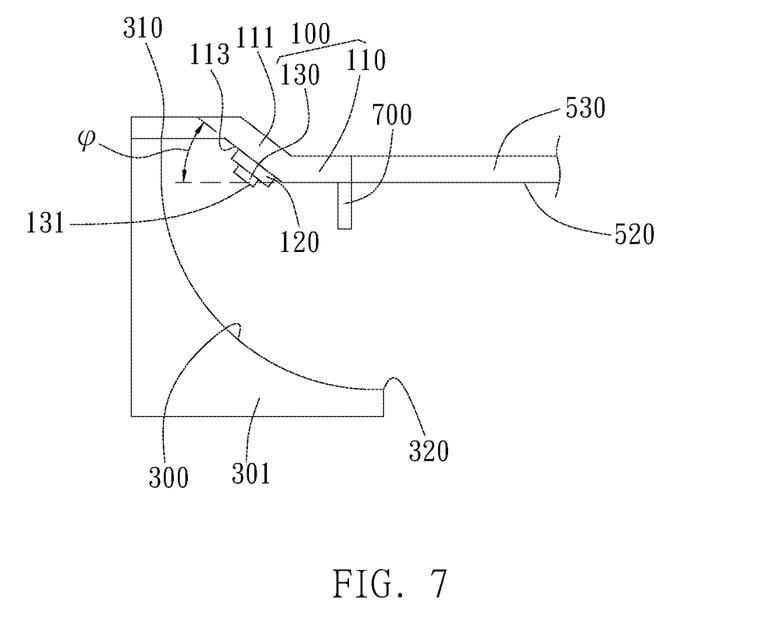
FIG. 7 is a cross-sectional view of a light source according to another embodiment.

In the embodiment shown in FIG. 7, the carrier substrate 110 is bent back and forth to form a slope portion 111 in the middle part thereof, and a carrying surface 113 is formed on the surface of the slope portion 111 facing the reflector 300. The light unit 130 may be directly disposed on the carrying surface 113 or indirectly disposed on the carrying surface 113 by means of the light unit substrate 120 shown in FIG. 7. The carrying surface 113 preferably tilts toward the first end 310 relative to a plane where the light-receiving surface 520 is located. In other words, the carrying surface 113 relatively faces the reflector 300 more than the light-receiving surface 520. An angle φ is formed between the carrying surface 113 and the plane where the light-receiving surface 520 is located. The angle φ is preferably less than 30 degrees to increase light use efficiency.

Figure 8:
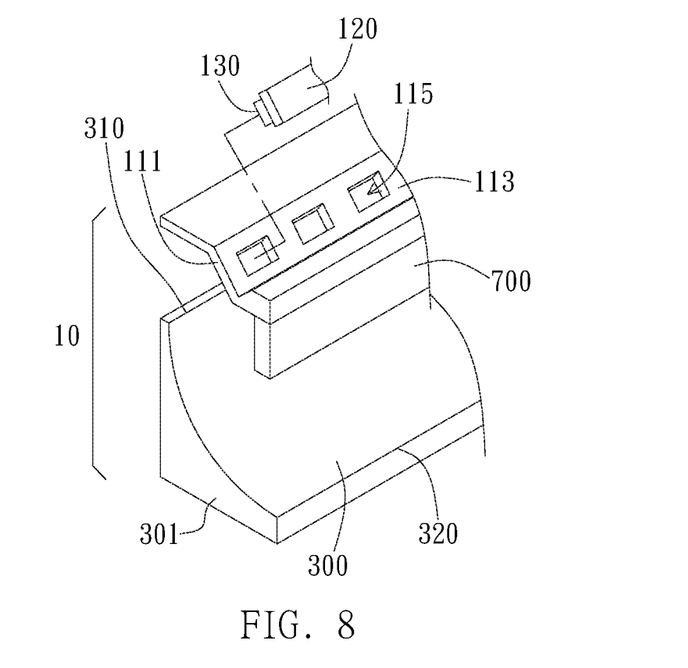
FIG. 8 is a cross-sectional view of a light source according to another embodiment.
Figure 9:
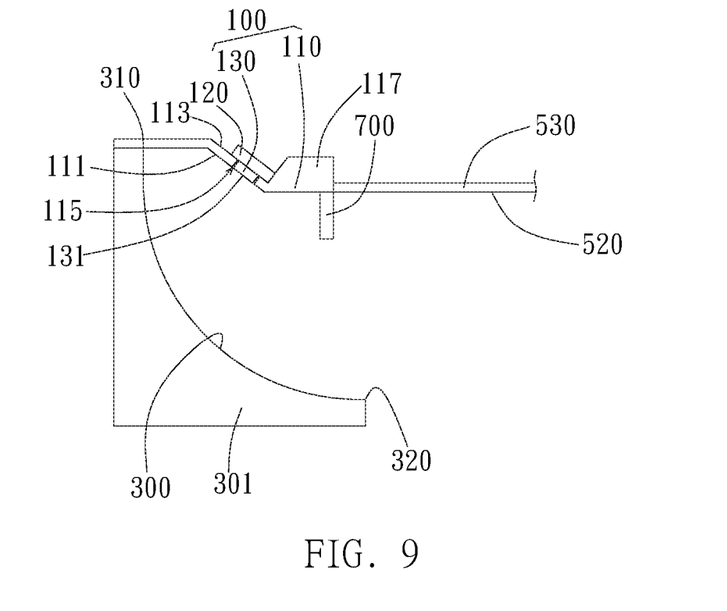
FIG. 9 is a cross-sectional view of the light source according to the embodiment of FIG. 8.

FIG. 8 and FIG. 9 show another embodiment of the light source 100. In this embodiment, a plurality of positioning holes 115 is formed on the carrier substrate 110, and the positioning holes 115 are preferably arranged along the first direction X. As shown in FIG. 8, the carrier substrate 110 has a slope portion 111, and the positioning holes 115 are preferably formed in the slope portion 111. In this case, as shown in FIG. 9, a surface of the slope portion 111 opposite the reflector 300 forms the carrying surface 113, the light unit substrate 120 is stacked on the carrying surface 113, and the light units 130 are accommodated in the positioning holes 115.

In addition, as shown in FIG. 9, the carrier substrate 110 further includes a protruding rim 117 installed on the carrying surface 113. The protruding rim is preferably disposed on a side of the carrying surface 113 at a bottom of the slope portion 111, but is not limited thereto. The protruding rim 117 preferably extends along the first direction X or is arranged at intervals. An end of the light unit substrate 120 abuts against the protruding rim 117 to determine a relative position between the light unit substrate 120 and the carrier substrate 110.

Figure 10:
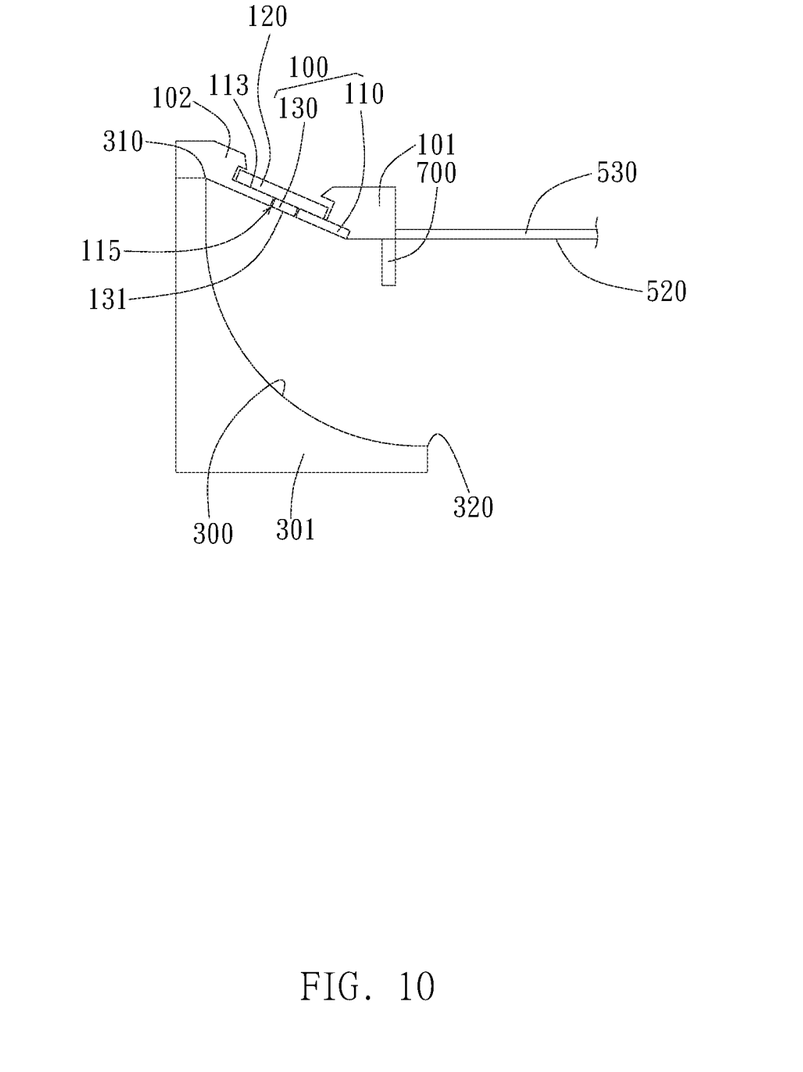
FIG. 10 is a cross-sectional view of a light source according to another embodiment.

In addition, in the embodiment shown in FIG. 10, the carrier substrate 110 has a first hook 101 and a second hook 102 disposed opposite each other and disposed on the carrying surface 113. The first hook 101 and the second hook 102 extend along the first direction X or are distributed at an interval. The first hook 101 is closer to the light-receiving surface 520, while the second hook 102 is farther away from the light-receiving surface 520. The light unit substrate 120 is arranged between the first hook 101 and the second hook 102 to reduce the possibility of being separated from the carrier substrate 110 under unexpected conditions.

The present invention has been described with reference to the above embodiments, but the above embodiments are merely examples for implementing the present invention. It should be noted that the disclosed embodiments are not intended to limit the scope of the present invention. On the contrary, any modification and equivalent configuration within the spirit and scope of the appended claims shall fall within the scope of the present invention.

What is claimed is:

1. A backlight module, comprising:
   a light source having at least one light unit arranged along a first direction;
   a reflector extending along the first direction, wherein a curve opposite the light unit is formed on a cross section perpendicular to the first direction; the reflector has a first end and a second end opposite each other, and the first end extends toward the light source while the second end forms a light exit with the light source;
   a chamber having a light entrance end facing the light exit, wherein the chamber has a light-receiving surface disposed on a side of the light source away from the first end and extends toward a direction away from the first end; and
   a block plate disposed between the at least one light unit and the light-receiving surface,
   wherein the at least one light unit has a light-emitting surface, the light-emitting surface tilts toward the first end with respect to a plane where the light-receiving surface is located, and an angle between the light-emitting surface and the plane where the light-receiving surface is located is less than or equal to 30 degrees.

2. The backlight module according to claim 1, wherein a first interval exists between the at least one light unit and the first end in a second direction perpendicular to the first direction and parallel to the light-receiving surface, and a ratio of a length by which the block plate extends from the light-receiving surface to the first interval is between 0.8 and 1.625.

3. The backlight module according to claim 2, wherein a section line on a cross section of the reflector perpendicular to the first direction is essentially a part of a first parabola, and at least a part of the at least one light source coincides with a focus of the first parabola.

4. The backlight module according to claim 1, wherein a section line on a cross section of the reflector perpendicular to the first direction is essentially a part of a first parabola, and at least a part of the at least one light source coincides with a focus of the first parabola.

5. The backlight module according to claim 1, wherein a length by which the block plate extends away from the light-receiving surface is not greater than 5 mm.

6. The backlight module according to claim 1, wherein an angle between the block plate and a plane where the light-receiving surface is located on the side of the block plate facing the at least one light unit ranges from 90 degrees to 110 degrees.

7. The backlight module according to claim 1, wherein the light source includes a carrier substrate, and the at least one light unit includes a plurality of light units, the light units being arranged on the carrier substrate, wherein the carrier substrate extends between the first end and the light-receiving surface along the first direction, and wherein on a third direction perpendicular to the light-receiving surface, a projection distance between the light-receiving surface and the second end is not greater than a projection distance between the carrier substrate and the second end.

8. The backlight module according to claim 7, wherein two ends of the carrier substrate are connected to the first end and an end of the light-receiving surface respectively.

9. The backlight module according to claim 8, wherein the block plate is installed on the carrier substrate or the light-receiving surface.

10. The backlight module according to claim 7, wherein the light source includes a side wall installed on the carrier substrate, and a top end and a bottom end of the side wall are respectively connected to an end of the carrier substrate and an end of the light-receiving surface.

11. The backlight module according to claim 10, wherein the block plate extends from the bottom end of the side wall that is connected to the light-receiving surface.

12. The backlight module according to claim 7, wherein the carrier substrate has a carrying surface for the light units to be disposed, the carrying surface tilting toward the first end with respect to the light-receiving surface, and an angle between the carrying surface and the light-receiving surface is less than 30 degrees.

13. The backlight module according to claim 1, wherein the light source includes a carrier substrate and a light unit substrate, the carrier substrate extending between the first end and the light-receiving surface along the first direction, wherein the at least one light unit comprises a plurality of light units disposed on the light unit substrate, and the light unit substrate is disposed on the carrier substrate.

14. The backlight module according to claim 13, wherein a plurality of positioning holes is formed on the carrier substrate, and each of the light units is at least partially accommodated in each of the positioning holes respectively.

15. The backlight module according to claim 14, wherein the light units are disposed on the light unit substrate, and the light unit substrate is stacked on a carrying surface of the carrier substrate facing away from the reflector.

16. The backlight module according to claim 15, wherein the carrier substrate has a protruding rim disposed on the carrying surface, and an end of the light unit substrate abuts against the protruding rim.

17. The backlight module according to claim 15, wherein the carrier substrate has a first hook and a second hook disposed on the carrying surface, and the light unit substrate is fitted between the first hook and the second hook.

* * * * *